United States Patent
Yamaoka

(10) Patent No.: US 12,229,875 B2
(45) Date of Patent: Feb. 18, 2025

(54) RECORDING MEDIUM, DISPLAY DATA GENERATION APPARATUS, AND DISPLAY DATA GENERATION METHOD

(71) Applicant: Mitsubishi Electric Corporation, Tokyo (JP)

(72) Inventor: Takayuki Yamaoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/708,221

(22) PCT Filed: Mar. 23, 2022

(86) PCT No.: PCT/JP2022/013697
§ 371 (c)(1),
(2) Date: May 8, 2024

(87) PCT Pub. No.: WO2023/181212
PCT Pub. Date: Sep. 28, 2023

(65) Prior Publication Data
US 2024/0338886 A1    Oct. 10, 2024

(51) Int. Cl.
G06T 15/10    (2011.01)
G06T 7/70    (2017.01)
G06T 17/00    (2006.01)

(52) U.S. Cl.
CPC ............ G06T 15/10 (2013.01); G06T 7/70 (2017.01); G06T 17/00 (2013.01);
(Continued)

(58) Field of Classification Search
CPC ........... G06T 15/10; G06T 7/70; G06T 17/00; G06T 2207/10016; G06T 2207/30164;
(Continued)

(56) References Cited

U.S. PATENT DOCUMENTS

| | | | |
|---|---|---|---|
| 2007/0050091 A1* | 3/2007 | Nagatsuka | B25J 9/1671 700/259 |
| 2009/0265030 A1 | 10/2009 | Huang et al. | |
| 2015/0248755 A1* | 9/2015 | Vagman | G05B 19/41875 382/103 |

FOREIGN PATENT DOCUMENTS

| | | | |
|---|---|---|---|
| CN | 106325215 A | * | 1/2017 |
| JP | H09-212219 A | | 8/1997 |

(Continued)

OTHER PUBLICATIONS

International Search Report and Written Opinion mailed on Jun. 14, 2022, received for PCT Application PCT/JP2022/013697, filed on Mar. 23, 2022, 8 pages including English Translation.

(Continued)

*Primary Examiner* — Jeffery A Brier
(74) *Attorney, Agent, or Firm* — XSENSUS LLP

(57) ABSTRACT

A program causes a display data generation apparatus to function as a moving image acquirer that acquires imaging data indicating a moving image of an environment including a device, an estimator that estimates a position and an orientation of an imager capturing the moving image based on an object in the moving image, a log acquirer that acquires log data indicating a log of an operation of the device and an object position corresponding to the object, and a display controller that generates display data for displaying the moving image and a model moving image to be played synchronously. The model moving image is acquired by projecting, at the position and in the orientation, a three-dimensional model of the device placed with respect to the object position while changing the three-dimensional model based on the log.

8 Claims, 17 Drawing Sheets

(52) U.S. Cl.
CPC ............... *G06T 2207/10016* (2013.01); *G06T 2207/30164* (2013.01); *G06T 2207/30244* (2013.01)

(58) Field of Classification Search
CPC ........... G06T 2207/30244; G06T 19/00; G06T 13/20
See application file for complete search history.

(56) References Cited

FOREIGN PATENT DOCUMENTS

| | | |
|---|---|---|
| JP | 2009-266221 A | 11/2009 |
| JP | 2021-096610 A | 6/2021 |

OTHER PUBLICATIONS

Decision to Grant mailed on Oct. 18, 2022, received for JP Application 2022-544155, 5 pages including English Translation.

\* cited by examiner

PLACED PROPERLY

FIG.9

| Log Data | | | | |
|---|---|---|---|---|
| Time | First axis | Second axis | Third axis | Fourth axis |
| February 2, 2022 14:34:56.000 | 30 | 0 | 5 | 540 |
| ⋮ | ⋮ | ⋮ | ⋮ | ⋮ |

FIG.13
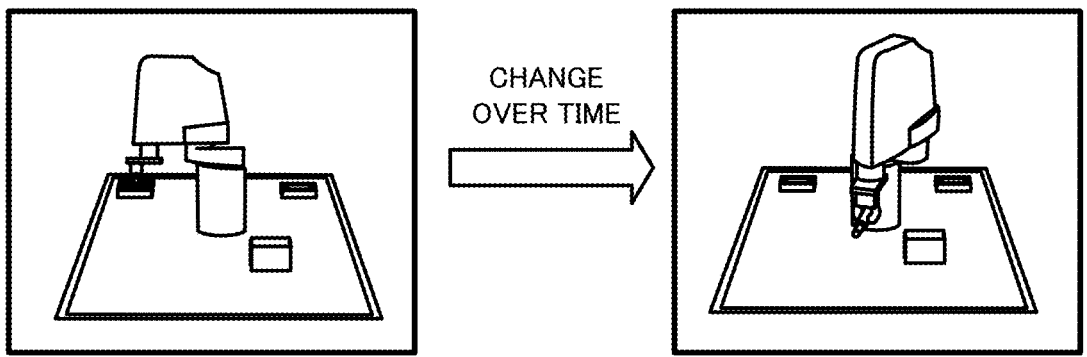
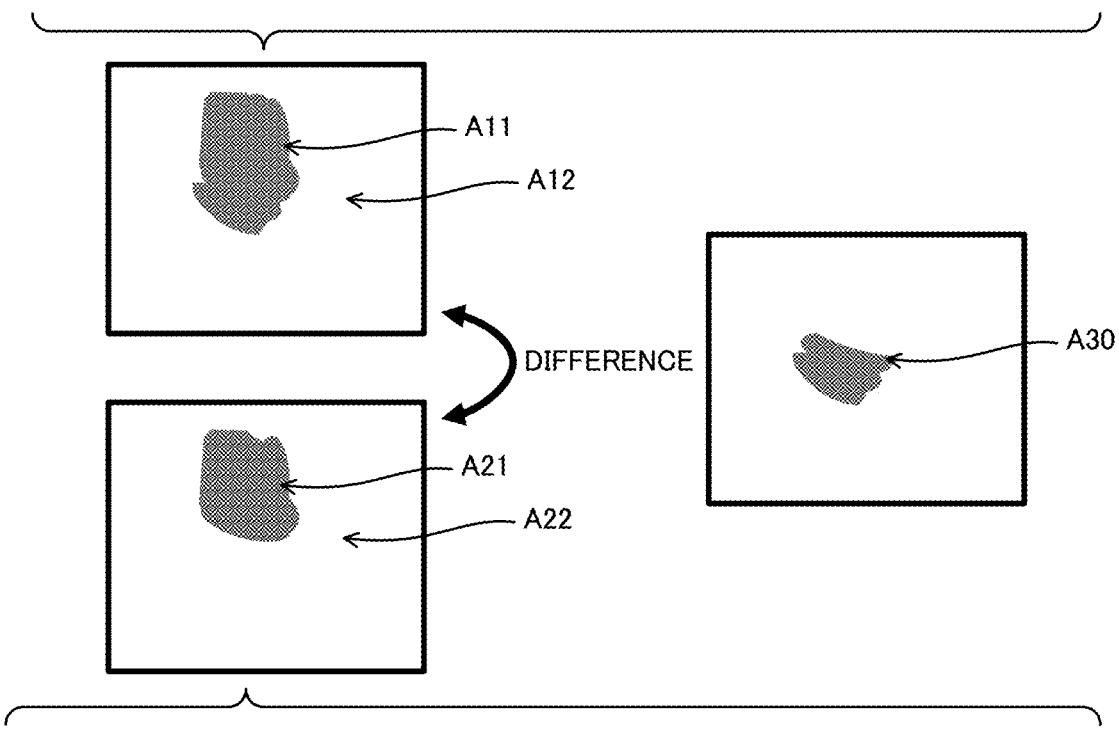
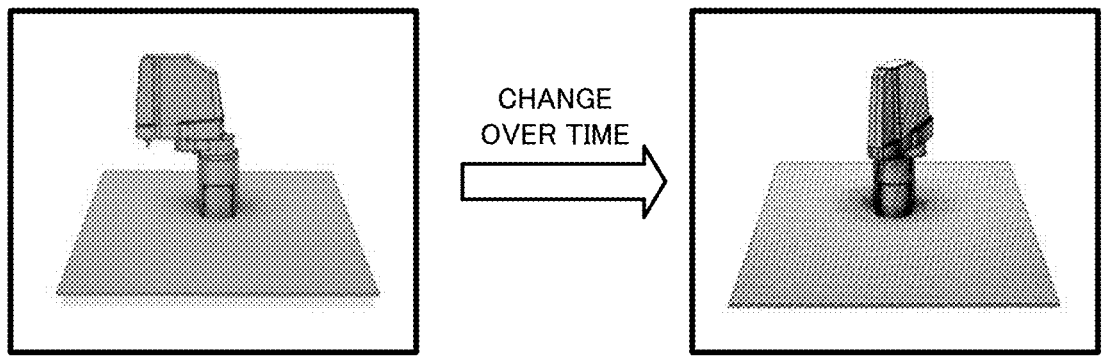

FIG.15
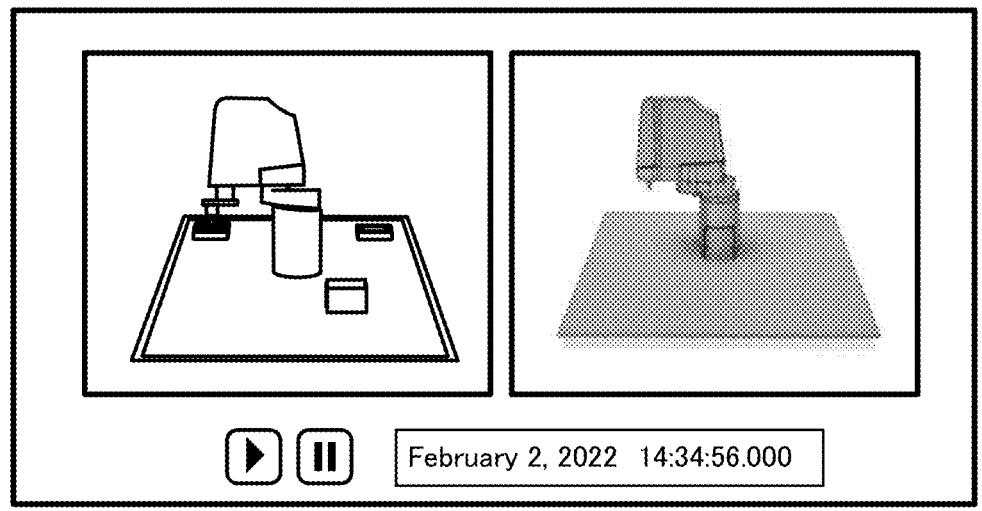
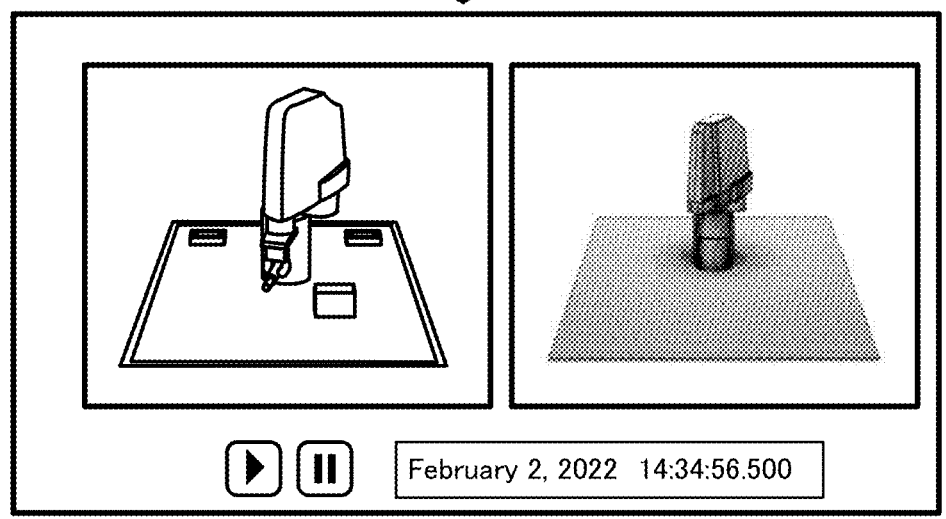
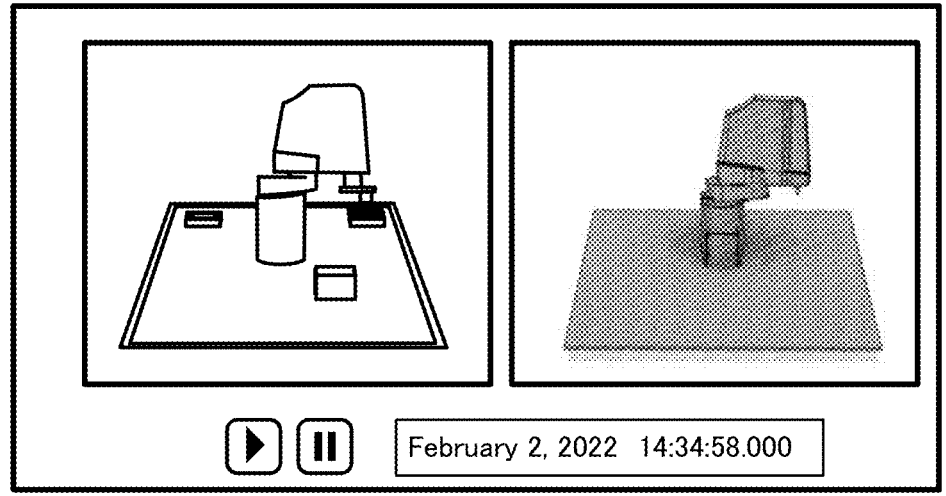

FIG.16
MARK PRINTED AS OBJECT
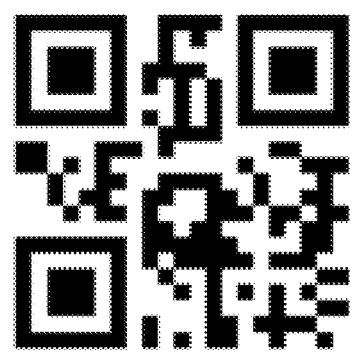
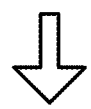
CAPTURED OBJECT
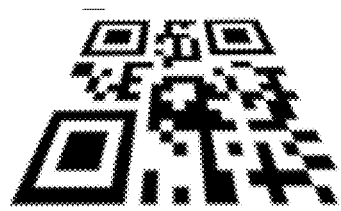

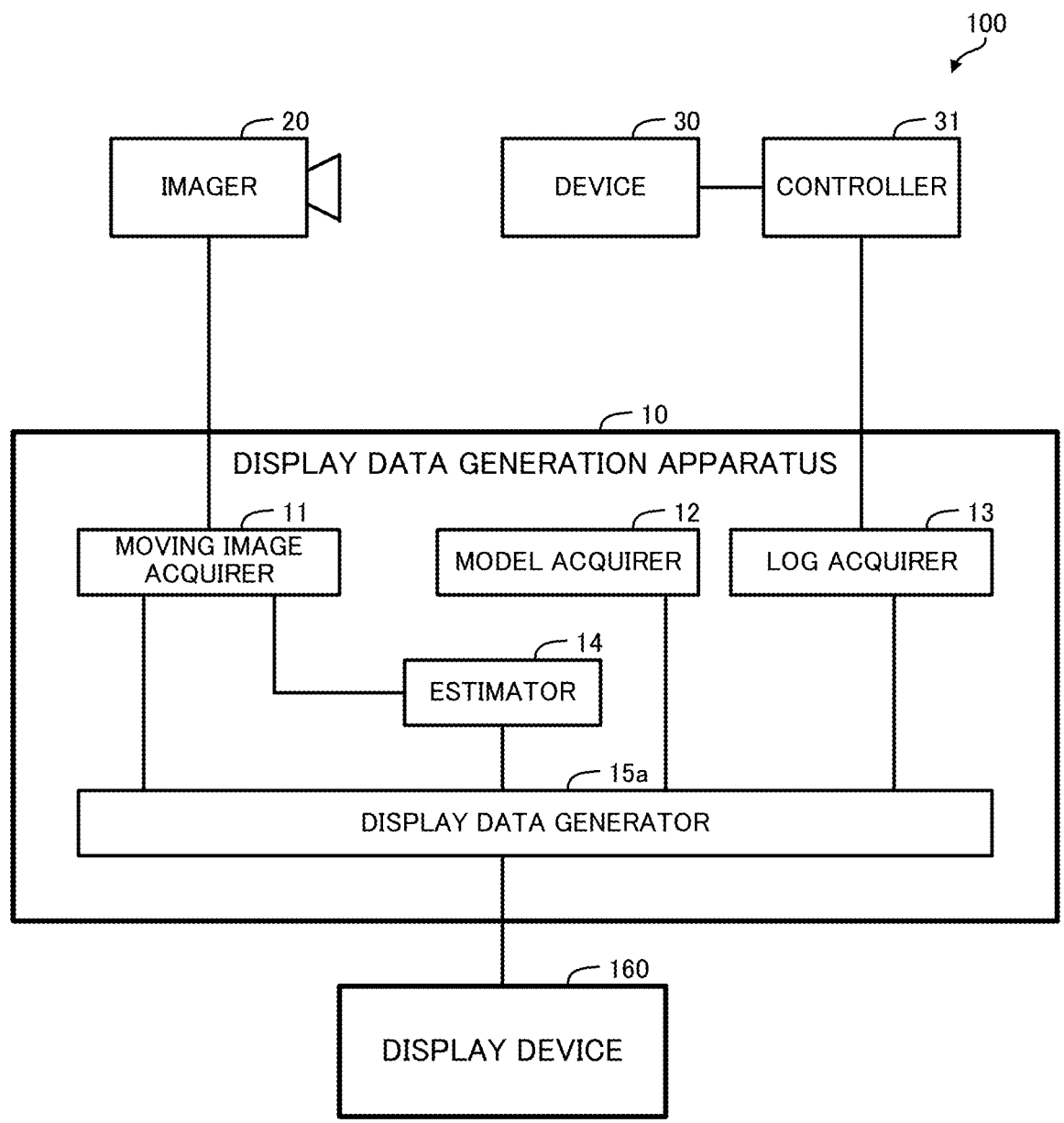

RECORDING MEDIUM, DISPLAY DATA GENERATION APPARATUS, AND DISPLAY DATA GENERATION METHOD

CROSS-REFERENCE TO RELATED APPLICATION

This application is a national stage application, pursuant to 35 U.S.C. § 371, of International Patent Application No. PCT/JP2022/013697, filed Mar. 23, 2022, the entire contents of which are incorporated herein by reference.

TECHNICAL FIELD

The present disclosure relates to a display data generation program, a display data generation apparatus, and a display data generation method.

BACKGROUND ART

At factory automation (FA) sites, many devices operate to perform various processes. Any abnormality that has occurred in such processes is investigated in detail by referring to information recorded in the past. For example, device verification is commonly performed after the occurrence of an abnormality using captured images of the device or record values indicating the operation state of the device.

However, comparing the captured images with the record values of the operation state involves in-depth knowledge of the device and is typically difficult. In determining whether the dimensions of a processing object fall within the tolerances, for example, such abnormality analysis may be assisted with a technique for displaying a captured image of the processing object and a three-dimensional model of the processing object in a superimposed manner (see, for example, Patent Literature 1). More specifically, the captured image of the device and the three-dimensional model of the device with the record values of the operation state are displayed in a superimposed manner to facilitate effective comparison between the captured image and each value indicating the operation state.

CITATION LIST

Patent Literature

Patent Literature 1: Unexamined Japanese Patent Application Publication

SUMMARY OF INVENTION

Technical Problem

As described above, the technique described in Patent Literature 1 facilitates verification of a device operating as intended at a specific time. Events associated with abnormalities at the sites can result from objects other than devices. When devices operate as intended, abnormalities may result from other substances such as workpieces, facilities different from the devices, operators acting unexpectedly, and movable substances such as pests or other animals. For a captured image including such a substance, the relationship between the substance captured in the image and an abnormality or the effect of the substance on the operation of the device is difficult to determine. Thus, an analyst who analyzes abnormalities in detail at FA sites is to be assisted further.

In response to the above circumstances, an objective of the present disclosure is to further assist an analyst who analyzes abnormalities in detail at FA sites.

Solution to Problem

To achieve the above objective, a display data generation program according to an aspect of the present disclosure is a program for causing a computer to function as moving image acquisition means for acquiring imaging data indicating a first moving image of an environment including a device, estimation means for estimating a position and an orientation of an imager capturing the first moving image based on an object in the first moving image, log acquisition means for acquiring log data indicating a log of an operation of the device when the first moving image is captured, model acquisition means for acquiring model data indicating a three-dimensional model of the device and an object position corresponding to the object, and display data generation means for generating and outputting display data for displaying the first moving image and a second moving image to be played synchronously. The second moving image is acquired by projecting, at the position and in the orientation estimated by the estimation means, the three-dimensional model placed with respect to the object position while changing the three-dimensional model based on the log.

Advantageous Effects of Invention

In the program according to the above aspect of the present disclosure, the display data generation means generates and outputs the display data for displaying the first moving image and the second moving image to be played synchronously. The second moving image is acquired by projecting, at the position and in the orientation estimated by the estimation means, the three-dimensional model of the device placed with respect to the object position while changing the three-dimensional model based on the log. Thus, the second moving image in which the viewpoint for capturing the three-dimensional model is substantially equal to the viewpoint for capturing the device is synchronously played with the first moving image. This allows an analyst to easily compare changes in the state of the real environment including the device with a series of operations of the device indicated by the log, and thus to easily determine the relationship between the substance captured in the image other than the device and an abnormality or determine the effect of the substance on the operations of the device. This can thus further assist the analyst who analyzes the details of the abnormalities at the FA sites.

BRIEF DESCRIPTION OF DRAWINGS

FIG. 9 is a table of example log data in Embodiment 1:

FIG. 13 is a diagram illustrating an example of area extraction in Embodiment 2:

FIG. 15 is a diagram of an example display by a display data generation apparatus according to a modification:

FIG. 16 is a diagram of an example object in the modification; and

FIG. 17 is a block diagram of the display data generation apparatus according to the modification.

DESCRIPTION OF EMBODIMENTS

A display data generation apparatus 10 according to one or more embodiments of the present disclosure is described in detail below with reference to the drawings.

Embodiment 1

Figure 1:
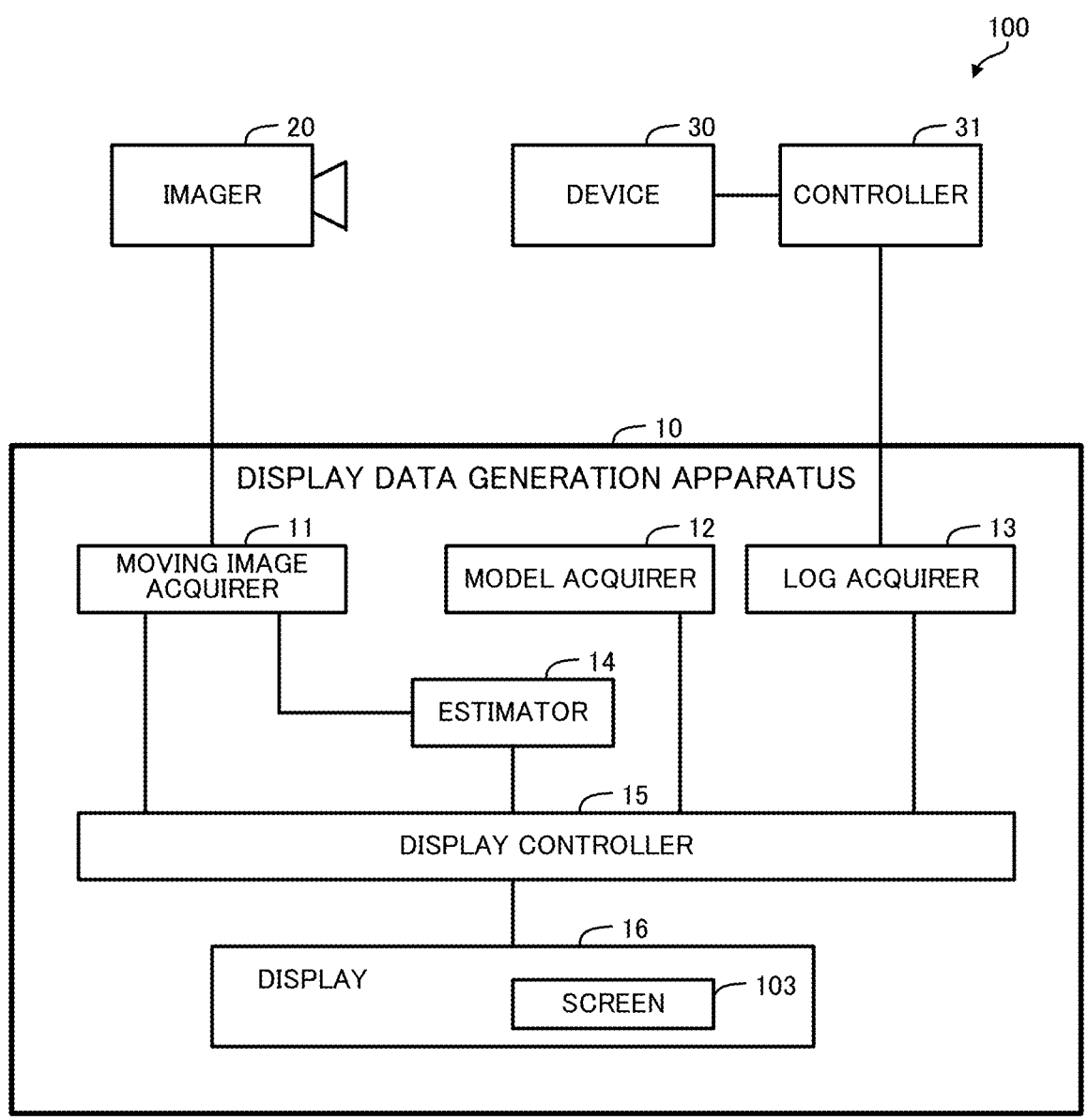
FIG. 1 is a block diagram of a display system according to Embodiment 1.

As illustrated in FIG. 1, the display data generation apparatus 10 according to the present embodiment is included in a display system 100 together with an imager 20 and a device 30. The imager 20 captures images of the device 30, and the device 30 is controlled by a controller 31. The display system 100 is used for abnormality analysis at a facility such as a factory. An abnormality herein refers to a state that is determined, by a manager, to fall out of a normal operating range of the facility. For example, damage to a workpiece processed by the device 30 and a deviation of the movement path of the workpiece from a pre-designed flow line correspond to such abnormalities. One abnormality may cause another abnormality. For example, an abnormality in a workpiece may cause an abnormal state of the device 30.

Figure 2:
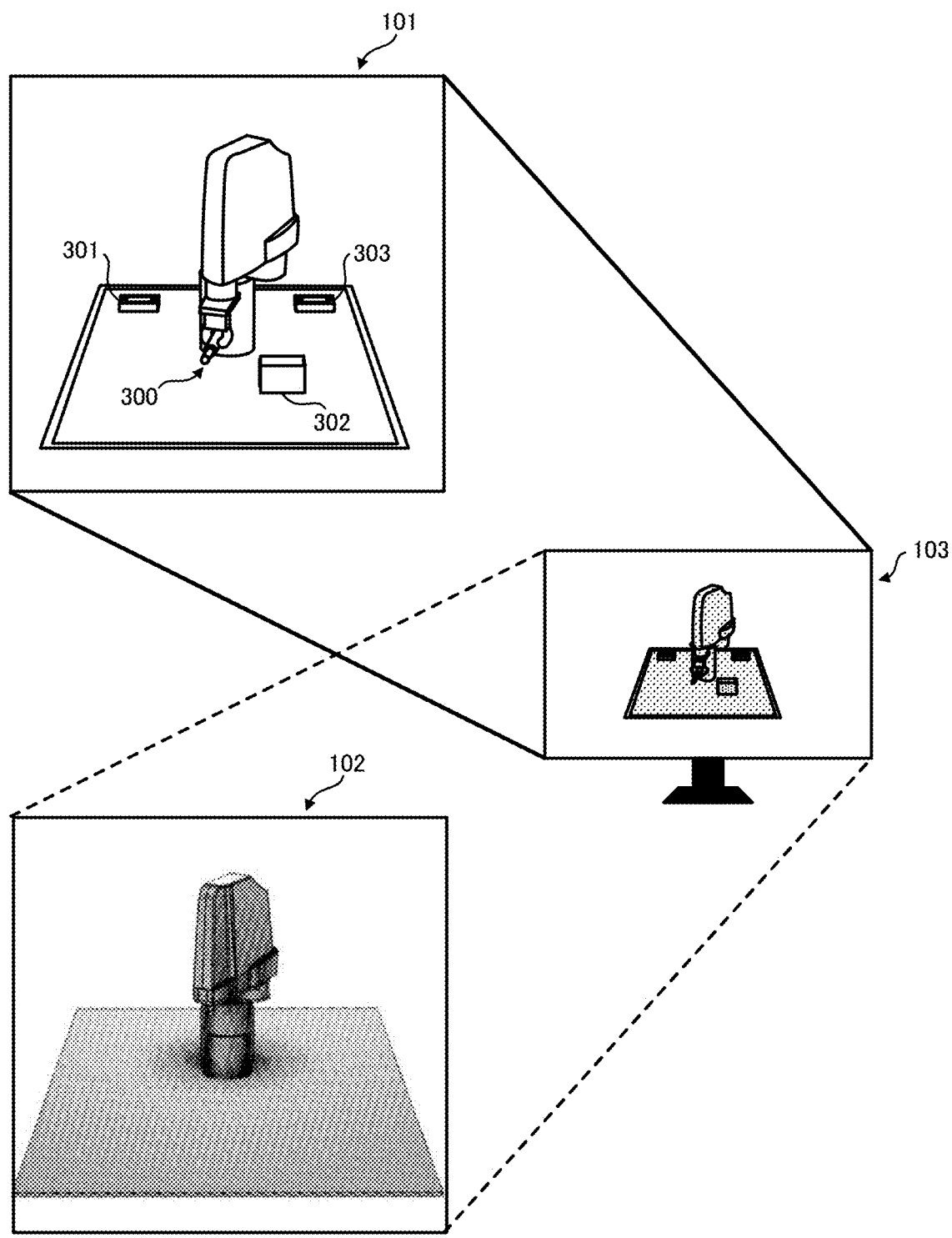
FIG. 2 is a diagram illustrating an overview of a display performed by the display system according to Embodiment 1.

As illustrated in FIG. 2, the display system 100 combines a moving image 101 of the environment of the device 30 and a moving image 102 of a three-dimensional (3D) model drawn based on the operation log of the device 30 and displays the resultant image on a screen 103. This assists abnormality analysis performed by an analyst.

The imager 20 is a camera with an image sensor. The imager 20 is, for example, a camera recorder connected to a programmable logic controller (PLC), or a surveillance camera that operates independently of the PLC. The imager 20 periodically transmits imaging data indicating moving images including frame images of the device 30 and the surroundings of the device 30 to the display data generation apparatus 10 through an industrial network. The frame rate of the moving images captured by the imager 20 is, for example, 10 frames per second (fps) or 30 fps. The imager 20 may capture moving images with visible light or moving images with infrared light.

The device 30 is a factory automation (FA) device including movable parts. The device 30 described in the example below is mainly an industrial robot including an arm with four axes of freedom of motion. The device 30 operates in accordance with a control command from the controller 31. More specifically, as illustrated in the upper part of FIG. 2, the device 30 repeatedly performs a series of operations including gripping a workpiece 300 placed on a tray 301, moving the workpiece 300 into an inspector 302, gripping the workpiece 300 again after inspection, and moving the workpiece 300 to a tray 303.

Figure 3:
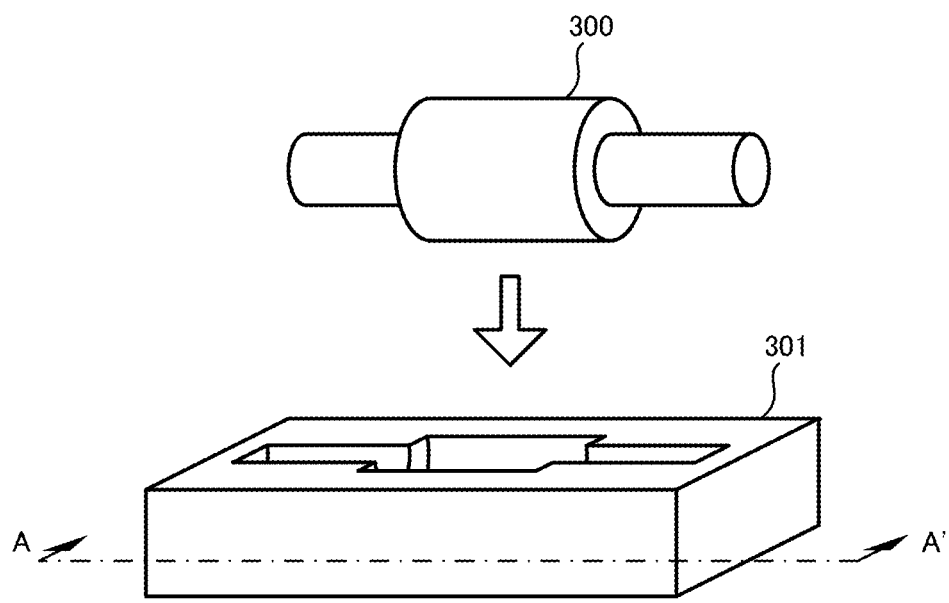
FIG. 3 is a diagram describing placement of a workpiece in Embodiment 1.

As illustrated in FIG. 3, the workpiece 300 is to be placed on the tray 301 with the axis maintained horizontally. In other words, as illustrated in FIG. 4 that is a cross-sectional view taken along line AA' in FIG. 3, the workpiece 300 having one end on the left and the other end on the right being horizontal is placed on the tray 301 properly.

Figure 5:
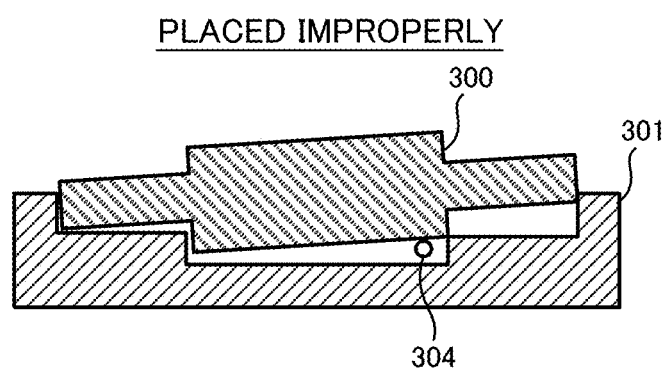
FIG. 5 is a diagram of the workpiece placed improperly in Embodiment 1.

As illustrated in FIG. 5, the workpiece 300 having one end and the other end tilted with respect to the tray 301 is placed on the tray 301 improperly. Such placement may cause an abnormality in the gripping state of the device 30, an inappropriate inspection in the inspector 302, and an abnormal stop of the device 30. However, a single captured image as illustrated in the upper part of FIG. 2 does not allow easy determination of the placement state as the cause of the abnormalities. Although the operation record of the device 30 is commonly taken, the orientation of the workpiece 300 is not usually recorded as a sensing target.

Figure 4:
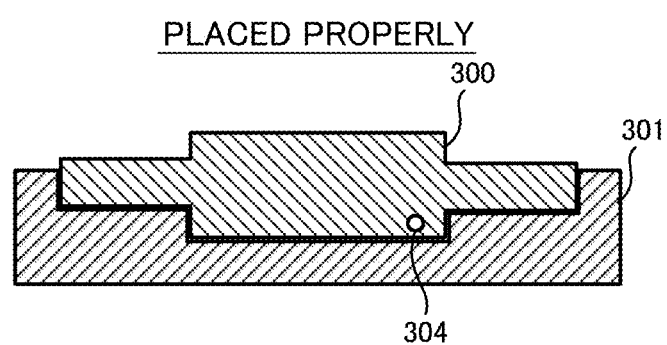
FIG. 4 is a diagram of the workpiece placed properly in Embodiment 1.

When a sensor 304 for determining the presence or absence of the workpiece 300 at the position indicated by the white circle in FIGS. 4 and 5, the output from the sensor 304 is on for the workpiece 300 placed properly, and the output from the sensor 304 is off for the workpiece 300 placed improperly. Referring to the above output allows easier determination of an abnormality associated with the tray 301 than when the sensor 304 is eliminated.

However, determining whether no workpiece 300 is on the tray 301 or the workpiece 300 has an abnormal orientation involves examining a captured image. When the image indicates that the workpiece 300 has an abnormal orientation, such a single captured image may not easily allow determination as to whether the abnormal orientation has been caused by another abnormality and whether the abnormal orientation is the cause of another abnormality.

Referring back to FIG. 1, the controller 31 may be a PLC. The controller 31 executes a predetermined ladder program to control the device 30. More specifically, the controller 31 controls, with a servo amplifier, the values of parameters such as rotation angles and angular velocities of each of the four axes included in the device 30. The controller 31 includes a recorder unit that records a log being a record of the values of the parameters. The controller 31 transmits log data indicating the log to the display data generation apparatus 10 through a communication line such as a universal serial bus (USB) cable.

Figure 6:
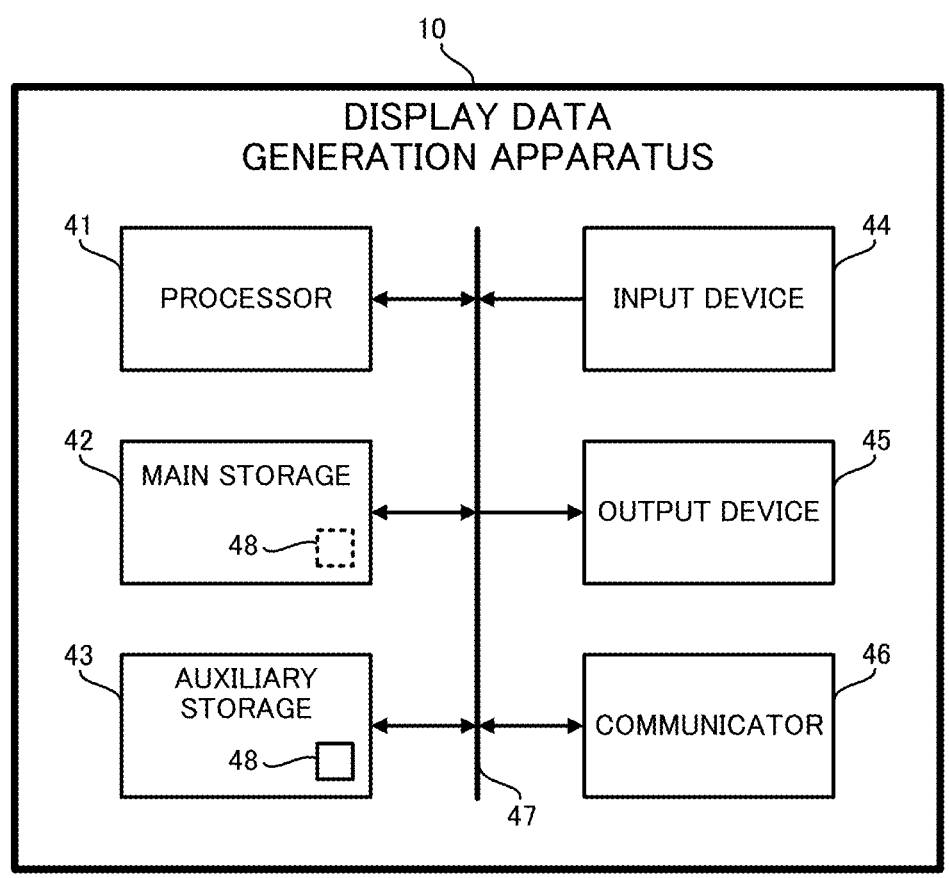
FIG. 6 is a block diagram of a display data generation apparatus according to Embodiment 1, illustrating the hardware configuration.

The display data generation apparatus 10 is a computer such as an industrial personal computer (PC) and a tablet terminal. As illustrated in FIG. 6, the display data generation apparatus 10 includes, as hardware components, a processor 41, a main storage 42, an auxiliary storage 43, an input device 44, an output device 45, and a communicator 46. The main storage 42, the auxiliary storage 43, the input device 44, the output device 45, and the communicator 46 are connected to the processor 41 with an internal bus 47.

The processor 41 includes a central processing unit (CPU) or a micro processing unit (MPU) as a processing circuit. The processor 41 executes a program 48 stored in the auxiliary storage 43 to implement various functions of the display data generation apparatus 10 and perform processing described later. The program 48 corresponds to an example of a display data generation program.

The main storage 42 includes a random-access memory (RAM). The program 48 is loaded from the auxiliary storage 43 into the main storage 42. The main storage 42 is used as a work area for the processor 41.

The auxiliary storage 43 includes a nonvolatile memory, such as an electrically erasable programmable read-only memory (EEPROM) and a hard disk drive (HDD). The auxiliary storage 43 stores, in addition to the program 48, various data items used for the processing performed by the processor 41. The auxiliary storage 43 provides data usable by the processor 41 to the processor 41 as instructed by the processor 41, and stores data provided by the processor 41.

The input device 44 includes, for example, a keyboard or a pointing device. The input device 44 acquires information input by the user, who is the analyst, of the display data generation apparatus 10 and provides the acquired information to the processor 41.

The output device 45 includes, for example, a light-emitting diode (LED), a liquid crystal display (LCD), or a speaker. The output device 45 presents various items of information to the user as instructed by the processor 41.

The communicator 46 includes a communication interface circuit for transmitting and receiving signals to and from an external device. The communicator 46 receives a signal from the external device and outputs data indicated by the signal to the processor 41. The communicator 46 also transmits a signal indicating data output from the processor 41 to the external device.

With the hardware described above operating in cooperation, the display data generation apparatus 10 performs various functions. More specifically, as illustrated in FIG. 1, the display data generation apparatus 10 includes, as functional components, a moving image acquirer 11 that acquires a moving image of the device 30 captured by the imager 20, a model acquirer 12 that acquires model data indicating a 3D model of the device 30, a log acquirer 13 that acquires the log data indicating a log of the operation of the device 30, an estimator 14 that estimates the position of the imager 20 from the captured moving image, a display controller 15 that generates display data indicating details to be displayed and causes a display 16 to display the details, and the display 16 including a screen 103 on which the details in the display data appear. The display 16 is mainly implemented by the output device 45.

The moving image acquirer 11 is mainly implemented by the communicator 46. The moving image acquirer 11 requests the imager 20 to provide a moving image captured in a time range including a time specified by the user to receive imaging data indicating the moving image from the imager 20. The moving image captured may hereafter be referred to as a captured moving image. The moving image acquirer 11 may acquire the imaging data by reading the imaging data from a non-transitory recording medium such as a memory card or from an external server device, rather than by receiving the imaging data from the imager 20. The captured moving image corresponds to an example of a first moving image of an environment including a device. The moving image acquirer 11 corresponds to an example of moving image acquisition means for acquiring imaging data indicating the first moving image in the display data generation apparatus 10.

Figure 7:
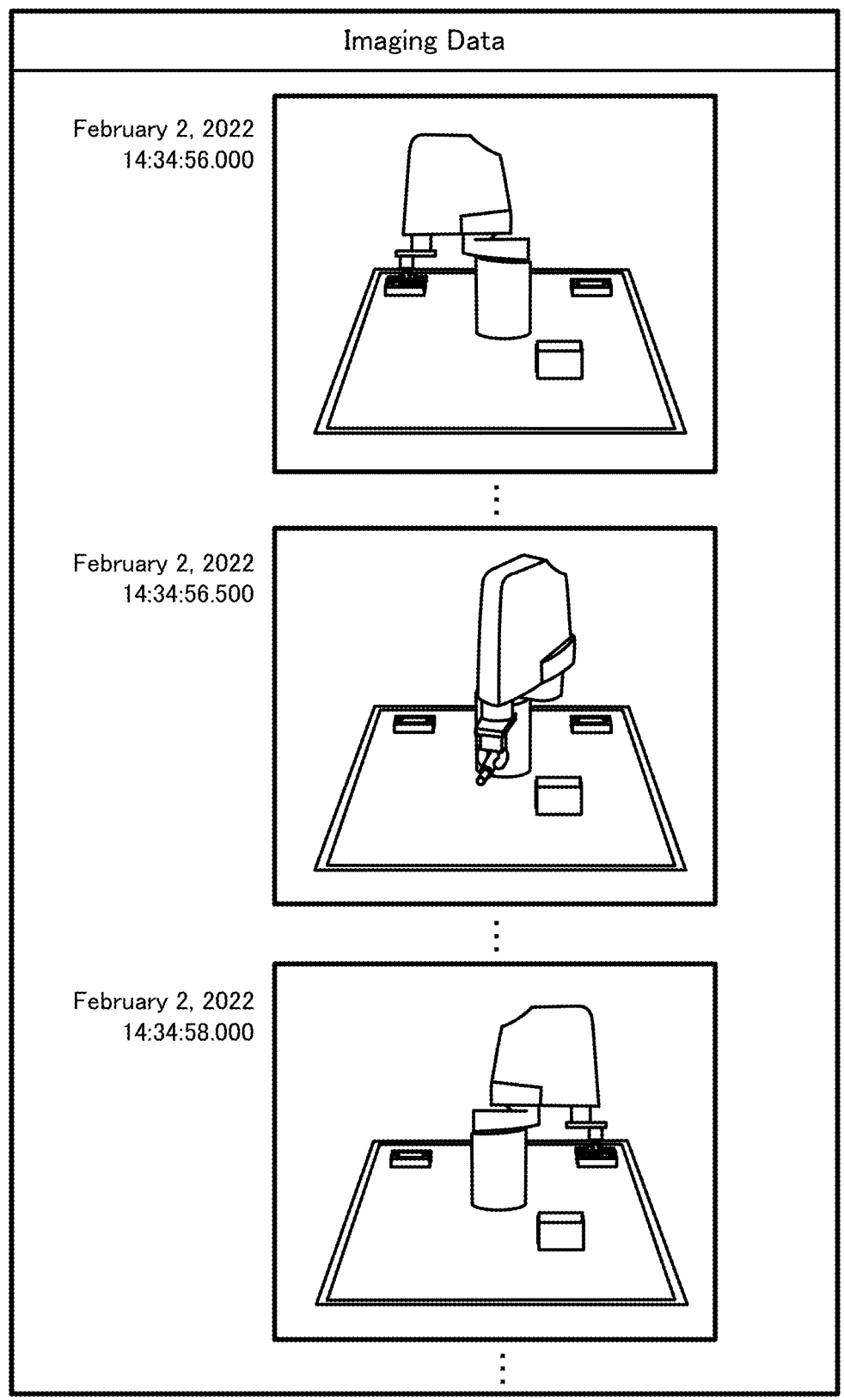
FIG. 7 is a diagram of example imaging data in Embodiment 1.

FIG. 7 schematically illustrates example imaging data. As illustrated in FIG. 7, the imaging data indicates multiple frame images in a manner associated with the respective capturing dates and times. The imaging data may include a value indicating the start date and time when the first frame image is captured and a value indicating a frame rate to substantially indicate the capturing date and time of each frame image. When the imaging data includes these values, the date and time when each frame image is captured is calculated from the start date and time, the frame rate, and the frame number. The method for indicating the capturing time of each frame image is not limited to the above, and may be changed as appropriate.

Referring back to FIG. 1, the model acquirer 12 is mainly implemented by the processor 41, the input device 44, and the communicator 46 operating in cooperation with one another. The model acquirer 12 acquires, from the user, the model data indicating the 3D model simulating the shape of the device 30. More specifically, the model acquirer 12 acquires the model data by reading the model data from an address in a non-transitory recording medium or the external server device specified by the user. The device 30 has the shape predefined by a mechanical design using a 3D computer-aided design (CAD) software application. The model data is generated using such a mechanical design, and indicates the spatial coordinates of points, lines, and surfaces defining the 3D model.

Figure 8:
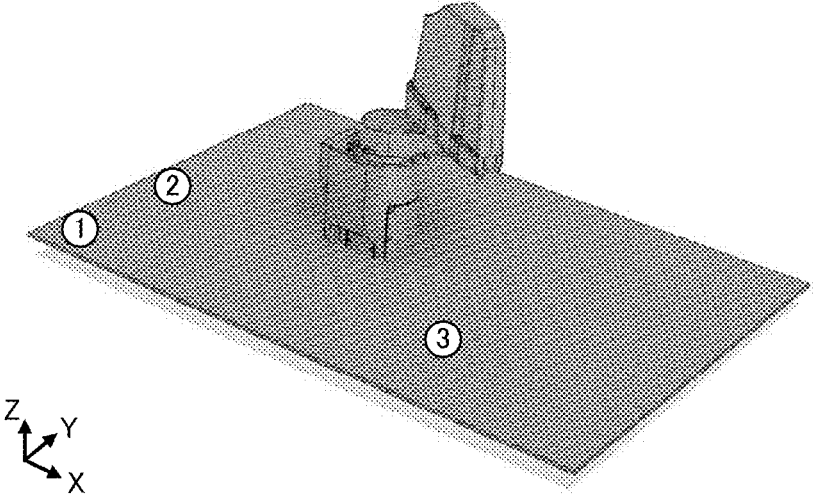
FIG. 8 is a diagram of example model data in Embodiment 1.

FIG. 8 schematically illustrates example model data. As illustrated in FIG. 8, the model data indicates the 3D model of the device using the spatial coordinates and also indicates object positions. Although a 3D model of a planar support base supporting the device 30 is also illustrated in FIG. 8, the 3D model of the support base may be eliminated. An object position indicates a position corresponding to an object in the captured moving image. In the example in FIG. 8, the positions of three marks being objects are indicated as object positions. The object positions are used to determine the scale and the angle of the 3D model. The determination of the scale and the angle based on the object positions is described in detail later. The model acquirer 12 corresponds to an example of model acquisition means for acquiring model data indicating a 3D model of a device and an object position corresponding to an object in the display data generation apparatus 10.

The log acquirer 13 is mainly implemented by the communicator 46. The log acquirer 13 requests the controller 31 to provide a log recorded in the time range including the time specified by the user to receive log data from the controller 31. The time specified by the user is equal to the time specified for the moving image acquirer 11. Thus, the time range in which the log acquired by the log acquirer 13 is generated overlaps the time range in which the captured moving image acquired by the moving image acquirer 11 is captured. The log acquirer 13 may acquire the log data differently, rather than by receiving the log data from the controller 31. The log acquirer 13 may acquire the log data by reading the log data from a non-transitory recording medium or the external server device, or may acquire the log data from the device 30 when the device 30 records a log. The log acquirer 13 corresponds to an example of log acquisition means for acquiring log data indicating a log of an operation of the device when the first moving image is captured in the display data generation apparatus 10.

The log data is information to reproduce the motion of the movable parts in the device 30. FIG. 9 illustrates example log data. In the example in FIG. 9, the log data indicates, with one rotation being 360 degrees, the angles of the first, second, third, and fourth axes of the device 30 in chronological order in a manner associated with the date and time of recording. Each record included in the log data may be a regular record or an irregular record.

Figure 10:
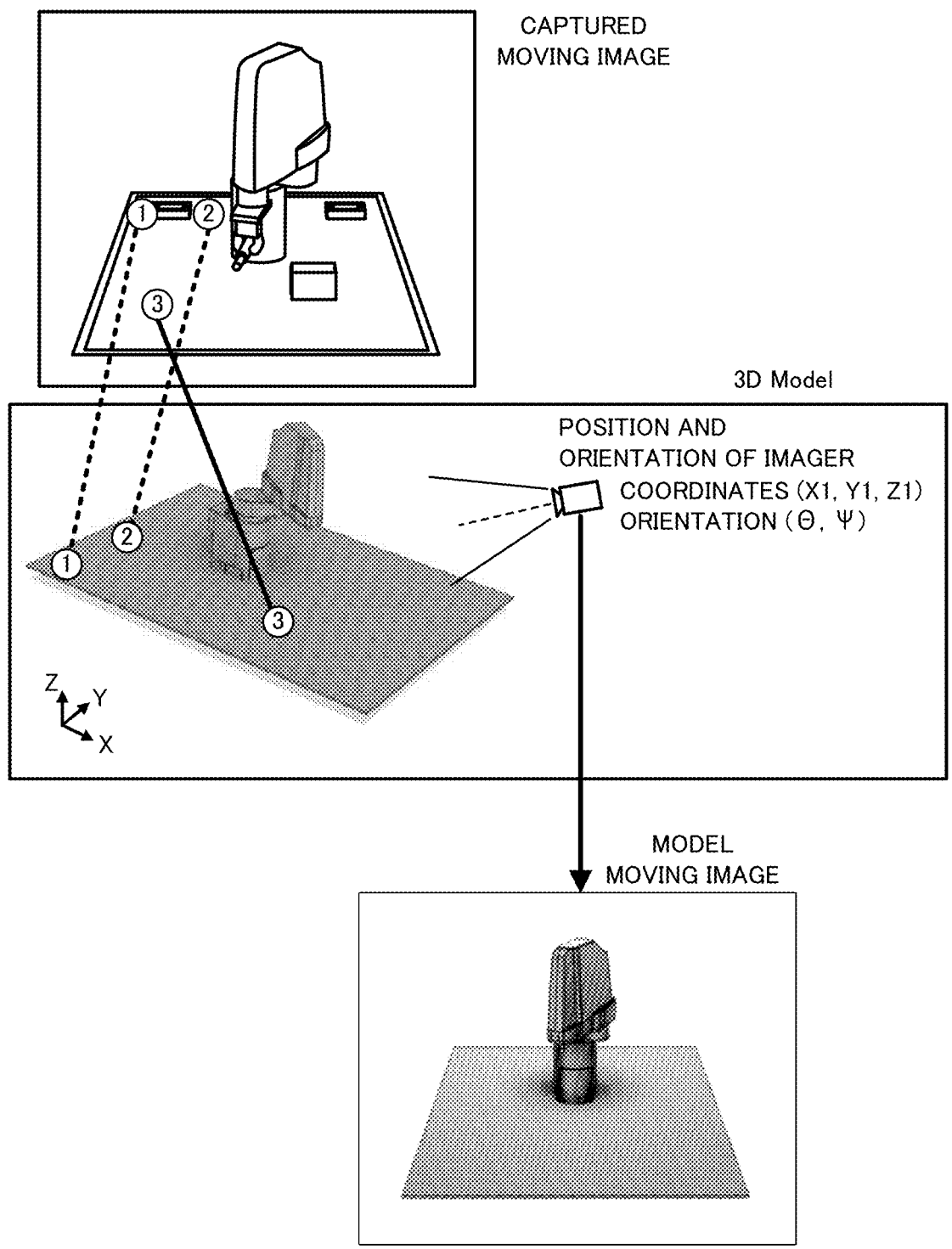
FIG. 10 is a diagram describing estimation of the position and the orientation of an imager in Embodiment 1.

The estimator 14 is mainly implemented by the processor 41. The estimator 14 acquires the captured moving image from the moving image acquirer 11 and estimates the position and the orientation of the imager 20 based on the objects in the captured moving image. More specifically, as illustrated in FIG. 10, the estimator 14 detects, from the captured moving image, the three mutually different marks pre-attached to the support base for the device 30 as objects. The estimator 14 then estimates the position and the orientation of the imager 20 based on the coordinates on the image including the detected objects. The estimation is performed using a known solution algorithm for the perspective-n-point (PnP) problem. The coordinates of the marks attached as objects are known. The position and the orientation of the imager 20 are defined in the same coordinate system as the coordinates of the mark. The estimator 14 corresponds to an example of estimation means for estimating the position and the orientation of an imager that captures the first moving image based on the object in the first moving image in the display data generation apparatus 10.

The display controller 15 is mainly implemented by the processor 41. The display controller 15 acquires the model data from the model acquirer 12 and the log data from the log acquirer 13 and changes the 3D model based on the log. More specifically, the display controller 15 changes, in the 3D model, the movable part models corresponding to the movable parts based on the values indicated by the log. For example, the display controller 15 rotates the movable part model corresponding to the first axis based on the record illustrated in FIG. 9 to match the angle of the movable part model with 30 degrees indicated by the log. The display controller 15 also rotates the movable part models for the other axes in the same manner. The display controller 15 rotates the movable part models by sequentially using the records with the other recording dates and times in the 3D model.

The display controller 15 virtually places the 3D model that changes based on the log as described above with respect to the object positions. The objects are attached to the support base stationary in the space to define a coordinate system in the real environment. The object positions in the model data are defined in the coordinate system common to the 3D model. The 3D model is thus defined in the coordinate system substantially common to the device 30 in the real environment. The display controller 15 virtually operates the above 3D model based on the log.

The display controller 15 then acquires, from the estimator 14, the result of estimation performed by the estimator 14 and projects the 3D model at the estimated position and in the estimated orientation to generate a moving image. In other words, the display controller 15 generates a moving image of the changing 3D model from the same position and orientation as the imager 20 that has captured the images of the device 30. The moving image acquired by projecting the 3D model may hereafter be referred to as a model moving image. In the example in FIG. 10, the coordinates (X1, Y1, Z1) indicate the estimated position of the imager 20, and the orientation ($\theta$, $\psi$) is the estimated orientation, where $\theta$ is to the azimuth angle, and $\psi$ is the elevation angle.

Although the projection method for the 3D model may also be used commonly as the projection method from the device 30 to the captured moving image, these projection methods may be different. For example, the estimator 14 may estimate the angle of view as an imaging range and the aberration in addition to the position and the orientation described above, and the display controller 15 may use the estimated angle of view and aberration in the projection of the 3D model. The display controller 15 may generate the model moving image by parallel projection of the 3D model onto a plane defined by the estimated position and orientation of the imager 20. Although the model moving image by the parallel projection has parameters, such as aberrations, different from the captured moving image, the model moving image may be any moving image that allows the user to verify the operation of the device 30 based on the log.

The display controller 15 causes a 3D simulator to display the generated model moving image on the display 16. The 3D simulator is a software application for three-dimensionally displaying a production facility or a controller and a simulation result of the operation of the production facility or the controller. The display controller 15 causes the captured moving image being semitransparent to appear synchronously with the model moving image in a manner superimposed on the model moving image in the area on the screen 103 in the display 16 in which the model moving image appear. In other words, the display controller 15 causes frame images in the model moving image generated from a record with a specific recording date and time included in the log to sequentially appear in a manner superimposed on the frame images in the captured moving image captured at a date and time equal to the specific recording date and time. The display controller 15 generates the display data for displaying the model moving image and the captured moving image to be played synchronously, and outputs the display data to the display 16, thus causing these moving images to appear on the screen in the display 16 in a superimposed manner.

For the frame images in the model moving image and the frame images in the captured moving image displayed simultaneously, the recording date and time of the log for generating the model moving image and the capturing date and time of the captured moving image may not completely match, and may have a permissible synchronization error. For example, the synchronization error may be 10 or 100 ms. The synchronization error is permitted unless the error affects the abnormality analysis when the analyst simultaneously views and compares the model moving image and the captured moving image. The display controller 15 may cause the model moving image and the captured moving image to be played simultaneously with a synchronization error within a predetermined range.

The model moving image corresponds to an example of a second moving image acquired by projecting, at a position and in an orientation estimated by the estimation means, a 3D model placed with respect to an object position while changing the 3D model based on the log. The display controller 15 corresponds to an example of display data generation means for generating and outputting display data for displaying the first moving image and the second moving image to be played synchronously in the display data generation apparatus 10.

Figure 11:
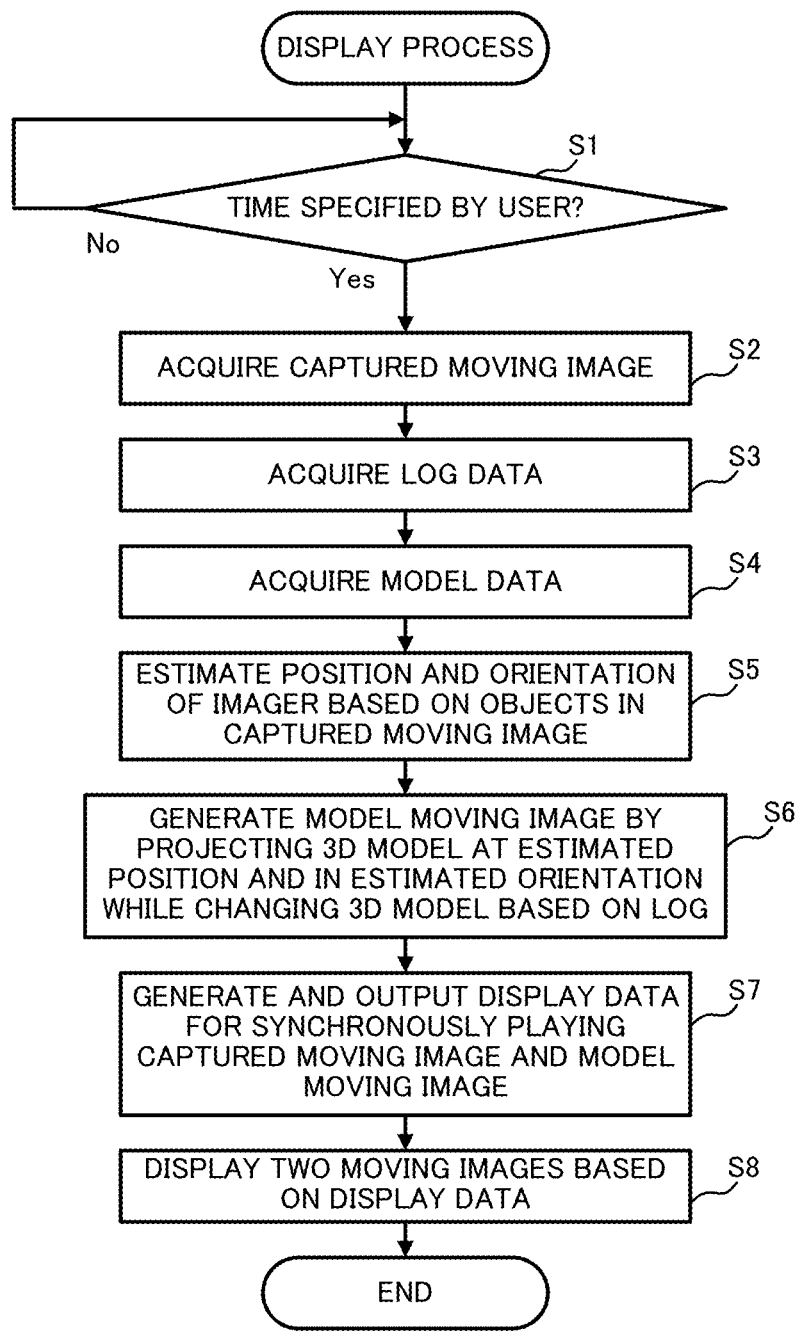
FIG. 11 is a flowchart of a display process in Embodiment 1.
Figure 12:
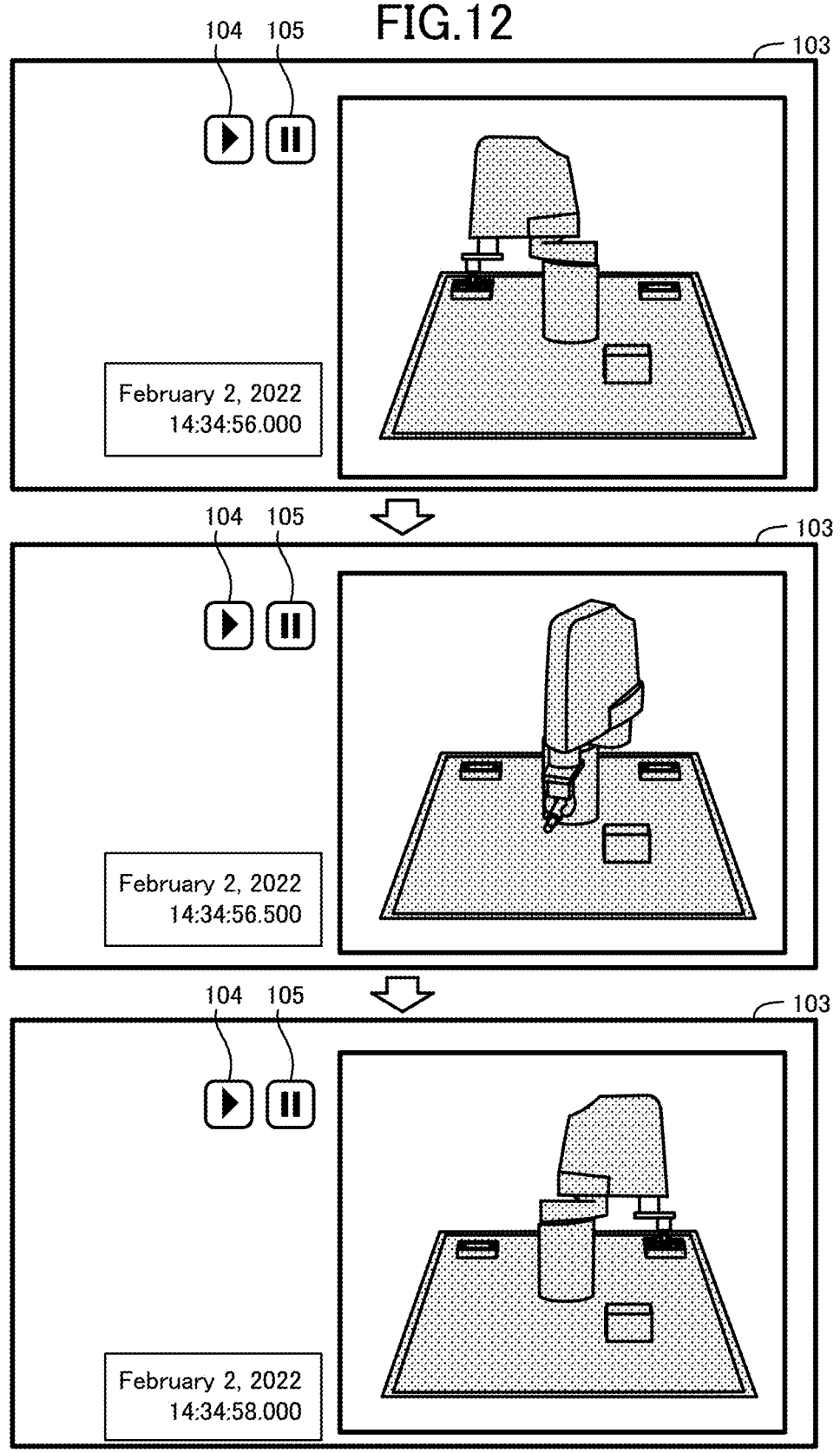
FIG. 12 is a diagram of an example display by the display data generation apparatus according to Embodiment 1.

A display process performed by the display data generation apparatus 10 is described with reference to FIGS. 11 and 12. The display process illustrated in FIG. 11 starts when the program 48 is executed. The display process corresponds to an example of a display data generation method implementable by the display data generation apparatus 10.

In the display process, the processor 41 in the display data generation apparatus 10 determines whether a time is specified by the user (step S1). The time corresponds to the date and time at which the user intends to play a moving image. The determination in step S1 may be performed as to whether a start time and an end time are specified, whether a time length for playing the moving image is specified along with a start time, or whether a time range before and after a specified time is specified along with the specified time. A time may be specified by the user with a predetermined length of time before and after the specified time. The determination result in step S1 may be affirmative when the time at which at least a part of the moving image is to be played is specified.

When the determination result in step S1 is negative (No in step S1), the display data generation apparatus 10 repeats the determination in step S1 and waits for the user to specify a time. When the determination result in step S1 is affirmative (Yes in step S1), the moving image acquirer 11 acquires a captured moving image captured in the range including the time specified in step S1 (step S2). The log acquirer 13 acquires a log recorded in a range including the time specified in step S1 (step S3). The model acquirer 12 acquires model data provided by the user (step S4).

The estimator 14 estimates the position and the orientation of the imager 20 based on objects in the captured moving image indicated by imaging data acquired in step S2 (step S5). The estimator 14 may estimate the position and the orientation of the imager 20 being stationary from the start to the end of the captured moving image based on objects in a single frame image. The estimator 14 may estimate the position and the orientation of the imager 20 being stationary based on objects in multiple frame images, thus increasing the estimation accuracy. The estimator 14 may sequentially estimate the position and the orientation of the imager 20 not being stationary for each frame image.

The display controller 15 generates a model moving image by projecting a 3D model indicated by the model data acquired in step S4 at the position and in the orientation estimated in step S5 while changing the 3D model based on the log indicated by log data acquired in step S3 (Step S6). More specifically, the display controller 15 uses a record corresponding to each of the recording dates and times included in the log in the 3D model, and then projects the 3D model based on the estimation result in step S5 to generate a frame image corresponding to each of the recording dates and times. When the imager 20 is not stationary and no estimation result is available at the capturing date and time equal to a recording date and time, the display controller 15 may use the closest estimation result or may use linearly interpolated estimation results before and after the recording data and time.

The display controller 15 generates display data for synchronously playing the captured moving image and the model moving image, and outputs the generated display data to the display 16 (step S7). More specifically, the display controller 15 controls the superimposed captured moving image and model moving image to be played in accordance with user operations on a play button 104 and a pause button 105 as illustrated in FIG. 12. This causes the display 16 to display the two moving images based on the display data (step S8). The display process ends.

The processing in each step and the order of the steps in the display process described above may be changed as appropriate. For example, steps S2, S3, and S4 may be performed in a different order or may be performed in parallel. Although step S2 is to be performed before step S5, steps S3 and S4 may be simply performed before step S6.

As described above, the display controller 15 generates and outputs the display data for displaying the captured moving image and the model moving image to be played synchronously. The model moving image is acquired by projecting, at the position and in the orientation estimated by the estimator 14, the 3D model of the device placed with respect to the object position while changing the 3D model based on the log. Thus, the model moving image in which the viewpoint for capturing the 3D model is substantially equal to the viewpoint for capturing the device is synchronously played with the captured moving image. This allows an analyst to easily compare changes in the state of the real environment including the device with a series of operations of the device indicated by the log, and thus to easily determine the relationship between the substance captured in the image other than the device and an abnormality or determine the effect of the substance on the operations of the device. This can thus further assist the analyst who analyzes abnormalities in detail at the FA sites.

The analyst can also examine the state when a defect occurs in a production facility and an FA device with an actual video together with the 3D model. This facilitates identification of the cause of the defect. This allows early recovery from the defect and improves the operation capacity of the FA device.

Embodiment 2

Embodiment 2 is described focusing on the differences from Embodiment 1 described above. The same reference signs denote the components that are the same as or similar to those in Embodiment 1, and such components are not described or are described briefly. The present embodiment differs from Embodiment 1 in emphasizing the result of a comparison between the model moving image and the captured moving image.

As illustrated in FIG. 13, the display controller 15 in the present embodiment extracts an area A11 including a set of pixels changeable between frames in a captured moving image and an area A12 including a set of pixels unchangeable. An unchangeable pixel may be a pixel having a pixel value with a change smaller than a predetermined threshold. Similarly, the display controller 15 extracts an area A21 including a set of pixels changeable between frames in a model moving image and an area A22 including a set of pixels unchangeable. The display controller 15 then extracts an area A30 corresponding to a difference between the changeable area A11 in the captured moving image and the changeable area A21 in the model moving image. More specifically, a set of pixels in the area A21 that are not included in the area A11 are extracted as the area A30.

The unchangeable area A12 does not change in and around the device 30 being captured. The unchangeable area A22 does not change in a 3D model. The areas A12 and A22 are thus not to be focused by the analyst. The overlapping portion of the changeable areas A11 and A21 is determined to be overlapping as a result of the device 30 operating as expected, and thus is not the area to be focused by the analyst.

In contrast, the area A30 corresponds to an area in which the device 30 is not operating as intended or an area in which a substance other than a substance depicted as a 3D model is captured in the captured moving image. The area A30 may possibly be associated with an abnormality and is thus to be focused by the analyst. The area A11 corresponds to an example of a first area changeable in the captured moving image. The area A21 corresponds to an example of a second area changeable in the model moving image.

Figure 14:
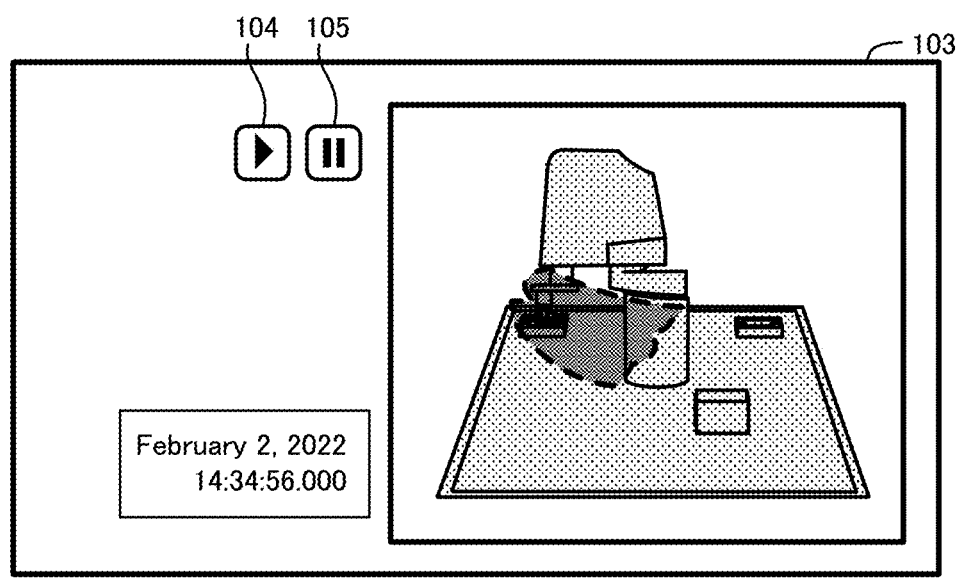
FIG. 14 is a diagram of an example display by a display data generation apparatus according to Embodiment 2.

The display controller 15 emphasizes, as illustrated with dark hatching in FIG. 14, a portion extracted as described above as the area A30 based on sequences of frame images. More specifically, the display controller 15 displays the captured moving image in a manner superimposed on the model moving image with the portion in the captured moving image corresponding to the area A30 with lower transparency than the other portions. The area A30 may be emphasized with a blinking dashed line indicating the area A30.

As described above, the display controller 15 corresponds to an example of the display data generation means for generating, based on a comparison between the first area changeable in the captured moving image and a second area changeable in the model moving image, the display data for partially emphasizing the first area.

Although the area 11 is partially emphasized in the above example, the area changeable in the captured moving image may be fully emphasized for potential changes in the captured moving image different from changes in the model moving image. A change in each pixel in the captured moving image and a change in each pixel in the model moving image may be compared, and a set of pixels with a difference between the changes greater than a predetermined threshold may be extracted as the area A30.

Although the embodiments of the present disclosure have been described above, the present disclosure is not limited to the above embodiments.

For example, although the captured moving image is superimposed on the model moving image in the above examples, the model moving image may be superimposed on the captured moving image.

Instead of displaying the model moving image and the captured moving image in a superimposed manner, the model moving image and the captured moving image may be synchronously played to appear adjacent to each other as illustrated in FIG. 15.

Although the imaging data indicates the capturing date and time of each frame image in the captured moving image, and the log data indicates the recording date and time of each record in the above examples, this is not limitative. For example, the imaging data may indicate the time length from when the controller 31 is activated to when each frame image is captured, and the log data may indicate the time length from when the controller 31 is activated to when each record is taken. The capturing time of each frame image indicated by the imaging data and the recording time of each record indicated by the log data may be times measured based on the same reference.

Although the model data indicates the object positions in addition to the third-dimensional model in the above examples, the object positions may be acquired separately from the model data by the model acquirer 12.

Although the estimator 14 detects the objects in the captured moving image, the user may specify the positions of the objects in the captured moving image on the image.

Although the three markers used as objects in the above examples, four or more markers may be used. An object different from the marker may also be used. For example, a single mark with a two-dimensional pattern printed as an object as illustrated in the upper portion of FIG. 16 may be attached to the support base, and the position and the orientation of the imager 20 may be estimated from the deformed state of the captured object, as illustrated in the lower portion of FIG. 16.

The display data generation apparatus 10 may include, in place of the display controller 15, a display data generator 15a that outputs the display data to an external display device 160 as illustrated in FIG. 17. For example, the display data generation apparatus 10 being a cloud server on the Internet may distribute, to the display device 160 being a user terminal, a web page as display data containing the model moving image and captured moving image and a script for synchronously playing the captured moving image along with the model moving image. In the example in FIG. 17, the display data generator 15a corresponds to an example of the display data generation means.

The functions of the display data generation apparatus 10 may be implementable by dedicated hardware or a common computer system.

For example, the program 48 executable by the processor 41 may be stored in a non-transitory computer-readable recording medium for distribution. The program 48 may then be installed in a computer to provide a device that performs the above processing. Examples of such a non-transitory recording medium include a flexible disk, a compact disc ROM (CD-ROM), a digital versatile disc (DVD), and a magneto-optical (MO) disk.

The program 48 may be stored in a disk device included in a server device on a communication network such as the Internet, and may be, for example, superimposed on a carrier wave to be downloaded to a computer.

The above processing may also be performed by the program 48 being activated and executed while being transferred through a communication network.

The above processing may also be performed by entirely or partially executing the program 48 on a server device while a computer is transmitting and receiving information about the processing through a communication network.

In the system with the above functions implementable partially by the operating system (OS) or through cooperation between the OS and applications, portions executable by applications other than the OS may be stored in a non-transitory recording medium that may be distributed or may be downloaded to a computer.

Means for implementing the functions of the display data generation apparatus 10 is not limited to software. The functions may be partly or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The structure according to one or more embodiments of the present disclosure may be used for analyzing abnormalities that occur at FA sites.

REFERENCE SIGNS LIST

100 Display system
10 Display data generation apparatus
11 Moving image acquirer
12 Model acquirer
13 Log acquirer
14 Estimator
15 Display controller
15a Display data generator
16 Display
20 Imager
30 Device 31 Controller
41 Processor
42 Main storage
43 Auxiliary storage
44 Input device
45 Output device
46 Communicator
47 Internal bus
48 Program
101, 102 Moving image
103 Screen
104 Play button
105 Pause button
160 Display device
300 Workpiece
301, 303 Tray
302 Inspector
304 Sensor

The invention claimed is:

1. A non-transitory computer-readable recording medium storing a display data generation program, the display data generation program causing a computer to function as:
   a moving image acquirer to acquire imaging data indicating a first moving image of an environment including a device;
   an estimator to estimate, based on an object in the first moving image, a position and an orientation of an imager capturing the first moving image;
   a log acquirer to acquire log data indicating a log of an operation of the device when the first moving image is captured;
   a model acquirer to acquire model data indicating a three-dimensional model of the device and an object position corresponding to the object; and
   a display data generator to generate and output display data for displaying the first moving image and a second moving image to be played synchronously, the second moving image being acquired by projecting, at the position and in the orientation estimated by the estimator, the three-dimensional model placed with respect to the object position while changing the three-dimensional model based on the log.

2. The non-transitory computer-readable recording medium according to claim 1, wherein
   the display data is data for displaying the first moving image and the second moving image in a superimposed manner.

3. The non-transitory computer-readable recording medium according to claim 2, wherein
   the display data generator generates, based on a comparison between a first area changeable in the first moving image and a second area changeable in the second moving image, the display data for partially or fully emphasizing the first area.

4. The non-transitory computer-readable recording medium according to claim 1, wherein
   the display data is data for displaying the first moving image and the second moving image adjacent to each other.

5. The non-transitory computer-readable recording medium according to claim 3, wherein
   the display data generator generates, based on a comparison between a first area changeable in the first moving image and a second area changeable in the second moving image, the display data for partially or fully emphasizing the first area.

6. The non-transitory computer-readable recording medium according to claim 1, wherein
   the display data generator generates, based on a comparison between a first area changeable in the first moving image and a second area changeable in the second moving image, the display data for partially or fully emphasizing the first area.

7. A display data generation apparatus for generating display data for displaying a first moving image of an environment including a device captured by an imager, the display data generation apparatus comprising:
   processing circuitry to
   acquire imaging data indicating the first moving image;
   estimate, based on an object in the first moving image, a position and an orientation of the imager;
   acquire log data indicating a log of an operation of the device when the first moving image is captured;
   acquire model data indicating a three-dimensional model of the device and an object position corresponding to the object; and
   generate and output the display data for displaying the first moving image and a second moving image to be played synchronously, the second moving image being acquired by projecting, at the position and in the orientation estimated, the three-dimensional model placed with respect to the object position while changing the three-dimensional model based on the log.

8. A display data generation method, comprising:
   acquiring, by a moving image acquirer, imaging data indicating a first moving image of an environment including a device;
   estimating, by an estimator and based on an object in the first moving image, a position and an orientation of an imager capturing the first moving image;
   acquiring, by a log acquirer, log data indicating a log of an operation of the device when the first moving image is captured;
   acquiring, by a model acquirer, model data indicating a three-dimensional model of the device and an object position corresponding to the object; and
   generating and outputting, by a display data generator, display data for displaying the first moving image and a second moving image to be played synchronously, the second moving image being acquired by projecting, at the position and in the orientation estimated by the estimator, the three-dimensional model placed with respect to the object position while changing the three-dimensional model based on the log.

* * * * *